United States Patent [19]

Patrovsky

[11] Patent Number: 4,710,288
[45] Date of Patent: Dec. 1, 1987

[54] FILTRATION SYSTEM

[76] Inventor: Hubert Patrovsky, 290 Samson Blvd., #1,, Ste. Dorothee, Quebec, Canada, H7X 3C1

[21] Appl. No.: 39,328

[22] Filed: Apr. 17, 1987

[51] Int. Cl.$^4$ .............................................. B01D 35/12
[52] U.S. Cl. .................................. 210/111; 210/359; 210/456; 425/197
[58] Field of Search ............... 210/111, 359, 398, 404, 210/416.1, 456; 425/197–199

[56] References Cited

U.S. PATENT DOCUMENTS

| 1,233,016 | 7/1917 | Bartlett | 210/456 |
| 4,588,502 | 5/1986 | Zibell et al. | 425/199 |
| 4,619,600 | 10/1986 | Gneuss | 425/197 |

*Primary Examiner*—Ivars Cintins
*Attorney, Agent, or Firm*—Chilton, Alix & Van Kirk

[57] ABSTRACT

A rotatable disc having an annularly arranged screening zone includes a plurality of like cavities separated by spacing webs. A housing for the disc includes a first plate with a front and rear side and a second plate with a front and rear side. The disc is rotatably mounted between the rear side of the first plate and the front side of the second plate. A first flow-through bore in the first plate has a front side and a rear side and a second, aligned flow-through bore in the second plate also has a front side and a rear side. The disc is mounted in the housing such that at least one of the cavities is in alignment with the first flow-through bore and the second flow-through bore, the first flow-through bore, the second flow-through bore and the at least one cavity forming a flow-through channel. The second flow-through bore has a preselected outer contour at the front side thereof. The first flow-through bore includes a flow-shape forming means for causing the contour of a cross-section of the molten flow at the rear side of the first flow-through bore to correspond with the preselected outer contour.

4 Claims, 3 Drawing Figures

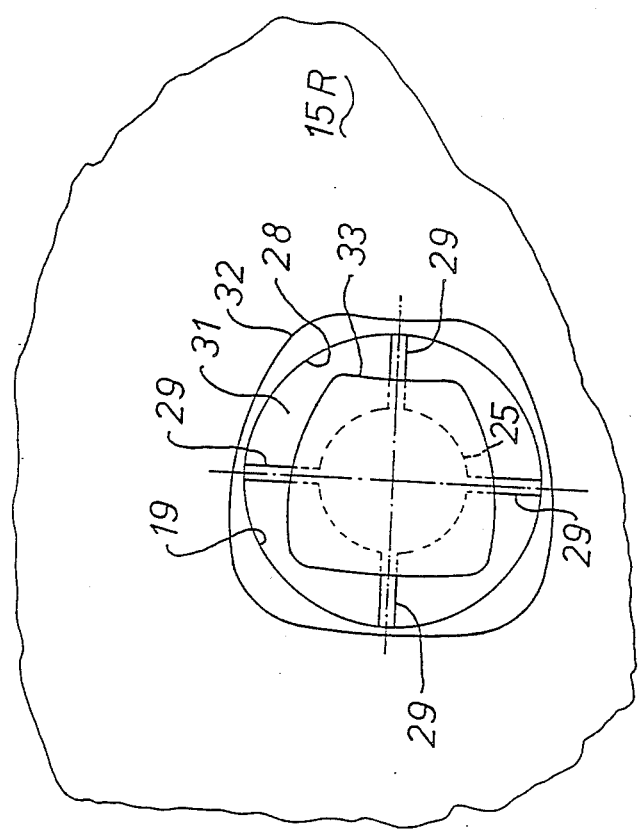

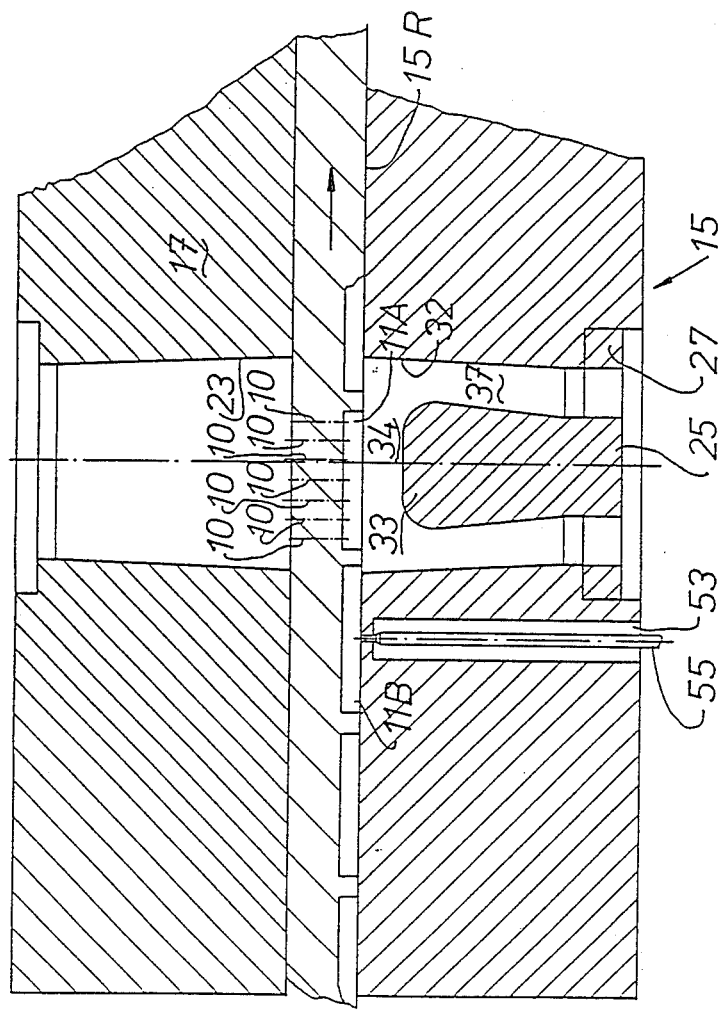

FILTRATION SYSTEM

BACKGROUND OF INVENTION

1. Field of the Invention

The invention relates to a filtration system for filtering a molten plastic flow. More specifically, the invention relates to such a filtration system which includes a rotatable screening disc having an annularly arranged screening zone comprising a plurality of cavities separated by spacing webs, the system being modified to operate with an increased active filter area.

2. Description of Prior Art

As is known in the prior art, in any filtration system, the filtering screens must, from time to time, be changed to cleanse them of the impurities they have captured in operation. Filtration systems with screen changing arrangements are taught in, for example, U.S. Pat. No. 4,167,384, Shirato et al, Sept. 11, 1979, U.S. Pat. No. 4,395,212, Lambertus, July 26, 1983, U.S. Pat. No. 4,588,502, Zibell et al, May 13, 1986, German Patentschrift DE No. 3 302 343 C2, Rehau Plastics AG, Oct. 24, 1985, German Offenlegungsschrift DE No. 33 02 343 A1, Gneuss, Aug. 2, 1984, German Patentschrift No. 33 02 343 C2, Rehau Plastics AG, Oct. 24, 1985, German Patentschrift DE No. 33 41 508 C1, Gneuss, Dec. 13, 1984. The Shirato et al patent uses two parallel screens, while the Lambertus patent teaches the use of a sliding plate with several screens. Neither of these relate to a system using a screening disc having a plurality of screens arranged in an annular screening zone therearound, as does the present invention, and are therefore not relevant having regards to the teachings of the present disclosure.

The remainder of the patents teach a system having such an annular screening disc. Thus, the '343 A1 and '343 C2 patents teach such a system. In both of these patents, the circular disc is housed in a housing which includes plates on either side of the disc, each of the plates having aligned flow-through bores. The disc is mounted in the housing such that there is always at least one cavity aligned with the aligned flow-through bores. The cavity will include a screen stack to filter the molten plastic of the molten plastic flow. In both of the German applications, the flow-through bores are circular in cross-section. Thus, the flow channel through the filtration system, consisting of the aligned flow-through bores and an aligned cavity, are virtually circular in cross-section.

The '502 patent teaches a similar system to the systems taught in the German references above-referred to. However, this patent teaches the added improvement of providing evacuation of a cavity preceding the cavity in the flow-through channel.

There are disadvantages to the system as described in the two German references and the '502 U.S. patent. Thus, the active filter area of this system is limited to approximately the cross-sectional area of the molten plastic flow in the round flow channel entering the filter. If it is attempted to increase the active filter area by simply increasing the circular area of the bores, then the material in the outer periphery of the increased area would tend to move so slowly that this material could be thermally deteriorated.

It is well known that an increase in the size of the active filter area is desirable so that a system which provides facilities for an increased active filter area has advantages over the systems as taught in the three above references.

The '502 U.S. patent notes that, when a new cavity enters into the flow channel, the air in the cavity entering the flow channel has to be removed. The '502 patent proposes that the cavity in advance of the cavity in the flow-through channel be evacuated so that when the evacuated cavity is subsequently inserted into the flow-through channel, it will not provoke any disturbances in the molten plastic nor will air from the channel be caught in the molten plastic flow.

However, with the system of the '502 patent, the cavity, on entering the flow-through channel, does not commence to be flooded until such time as the vacuum has already been turned off. Material in the bore-through holes of the cavity can, under these conditions, and due to thermal effects on the material in the bore-through holes, build up gases which will enter the cavity to break the vacuum to thereby erase the advantages of evacuating the cavity. It is pointed out that the vacuum will be off for perhaps as much as an hour until a cavity, on entering the flow-through channel, starts being flooded. It would therefore be of an advantage to provide a system wherein the cavity which is being flooded is still connected to the vacuum source at the same time that the cavity is being flooded.

Finally, in the above-described systems, when a new cavity enters the flow-through channel, there is a pressure drop in the system. This causes a pulsating type of response in the system which is unsatisfactory.

The "pulse" will increase with the volume of each cavity. Accordingly, there is an advantage to providing smaller sized (i.e., more) cavities.

In addition, an increased active filter area combined with smaller cavities increases the through-put capabilities of the filtration system while providing a steadier flow.

SUMMARY OF INVENTION

It is therefore an object of the invention to provide a filtration system which overcomes the disadvantages of the prior art systems.

It is a more specific object of the invention to provide such a filtration system which has an increased active filter area.

It is a still further object of the invention to permit such an increased active filter area in the filtration system by providing a flow-shape forming means in the flow-through bores of the input plate to the system.

It is a further object of the invention to provide a means for evacuating a cavity being flooded while the cavity is being flooded.

It is a still further object of the invention to provide a filtration system having a larger number of smaller sized cavities in the annularly arranged screening zone.

In accordance with the invention there is provided a filtration system for filtering a molten plastic flow flowing from a source to a tool which includes a rotatable disc having an annularly arranged screening zone comprising a plurality of like cavities separated by spacing webs. A housing for the disc comprises a first plate having a front side and a rear side, and a second plate having a front side and a rear side. The disc being rotatably mounted between the rear side of the first plate and the front side of the second plate. A first flow-through bore in the first plate has a front side and a rear side, and a second, aligned, flow-through bore in the second plate has a front side and a rear side. The disc is mounted in the housing such that at least one of the cavities is in alignment with the first flow-through bore and the second flow-through bore, the first flow-through bore, the second flow-through bore and the at least one cavity forming a flow-through channel. The second flow-through bore has a pre-selected outer contour at the front side thereof. The first flow-through bore comprises flow-shape forming means for causing the contour of a cross-section of the molten flow at the rear side of the first flow-through bore to correspond with the pre-selected outer contour.

BRIEF DESCRIPTION OF DRAWINGS

The invention will be better understood by an examination of the following description, together with the accompanying drawings, in which:

FIG. 2 illustrates the rear face of the flow-through bore of the input plate of the housing of the system; and FIG. 3 illustrates the cavity evacuation system in accordance with the invention.

DESCRIPTION OF PREFERRED EMBODIMENTS

Figure 1:
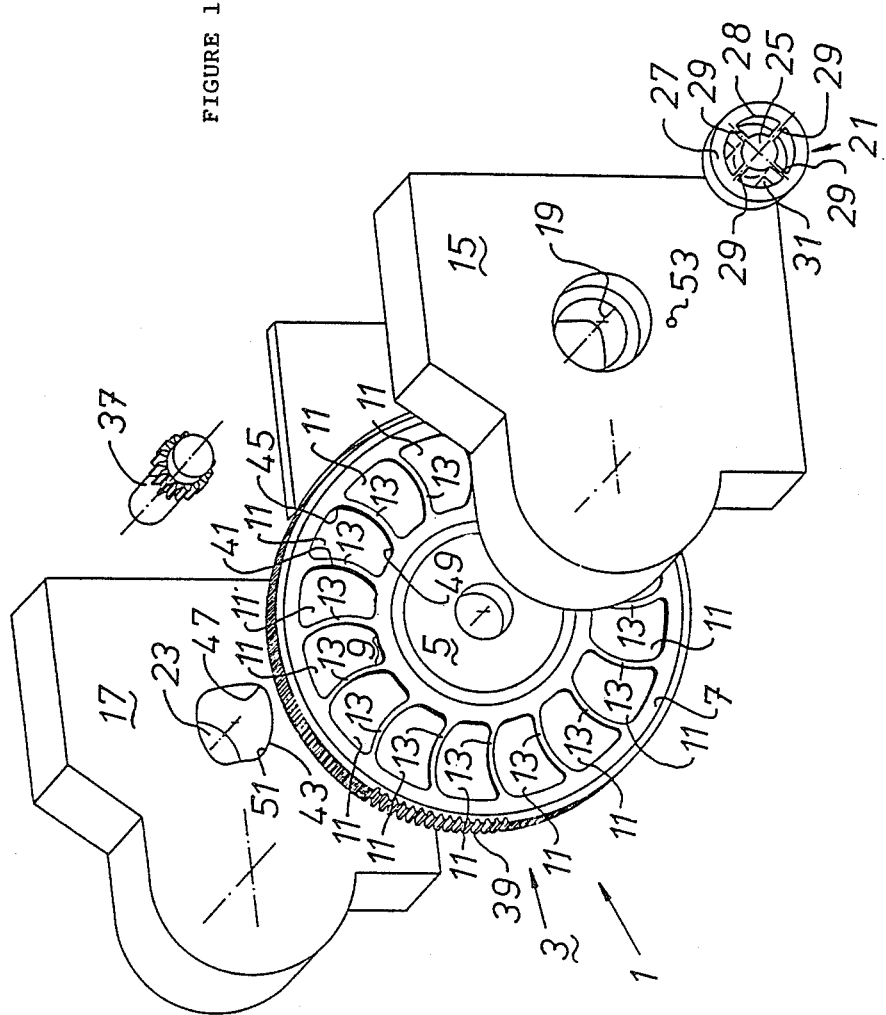
FIG. 1 is a exploded view of a filtration system in accordance with the invention.

Referring to the drawings, the novel filtration system, illustrated generally at 1, comprises a rotatable disc 3 having a fixed member 5 and a rotatable member 7. Annularly arranged screening zone 9, on the rotatable portion, comprises a plurality of like cavities 11. The cavities are separated by spacing webs 13.

The disc 3 is rotatably mounted in a housing comprising a first, input, plate 15 and a second, output, plate 17. Plate 15 comprises a flow-through bore 19, which includes a flow-shape forming means 21 which will be further described below. An output from the source of molten plastic (not shown) is connected to the flow-through bore 19.

Plate 17 comprises a flow-through bore 23 which is aligned with flow-through bore 19. The circular disc is mounted in the housing so that at least one cavity is always aligned with aligned bores 19 and 23. As bore 23 is connected to a tool wherein the molten plastic is to be used, the aligned bores 19 and 23 along with the cavity in alignment with the bores form a flow-through channel for the molten plastic.

Turning now to the flow-through shape forming means, this comprises a circular core 25 and a circular, concentric, outer ring 27. The core 25 is connected to the ring 27 by webs 29. The core 25 and the outer ring 27 form, between them, a flow ring 31 through which the molten plastic will flow.

Turning now to FIG. 2, the rear face of the flow-shape forming means 21 comprises a core continuation 33 whose cross-sectional outline corresponds with the contour of the flow-through bore 23. The rear face 15R of plate 15 has an opening 32 whose cross-sectional outline also corresponds with the contour of flow-through bore 23. (See also FIG. 3).

It will of course be appreciated that the core continuation 33 is integral with core 25 (as best seen in FIG. 3). The circular shape of 25 is transformed into the shape of 33 by machining as is known in the art. The circular shaped opening on the front side of plate 15 is also transformed to the shape of 32 on the rear side 15R of plate 15 by machining as is, once again, known in the art.

Thus, the molten flow in the middle of plate 15 comprises a tube having a cross-sectional shape corresponding to the contour of flow-through bore 23.

The hollow area surrounded by the tube of molten plastic will quickly be filled in, in the space 34 before the rear 15R of plate 15, so that, as the molten plastic exits from the flow-through bore of plate 15 and enters the adjacent cavity 11A (see FIG. 3), it will assume the form of a solid member having a cross-section in the shape of the contour on the front side of flow-through bore 23. However, it is noted that, with the flow-shape forming means, plastic has been driven through to the outer periphery of the contour. It will be seen that the cross-sectional area of molten plastic entering the filtration system through the front side of flow-shape forming means 21 is defined by the inner periphery 28 of the outer ring 27 of flow-shape forming means 21. The cross-sectional area of the molten plastic exiting on the rear side of plate 15 is defined by the shape of 32 on the rear side 15R of the plate 15. As clearly seen in FIG. 2, the area defined by 32 is larger than the area defined by 28. Thus, the cross-sectional area of the molten plastic entering into the screen area of the filtration system is greater than the cross-sectional area at the output of the source of molten plastic. It can therefore be seen that the active filtering area has been increased due to the employment of the flow-shape forming means 21 in the flow-through bore 19 of the input plate 15. The increase in active filtering area, of course, results in a higher put-through by the filtration system.

The cross-sectional area of 23, as can be seen in FIG. 3, matches the cross-sectional area of 32.

It is noted that the active filter area could be increased even if the contour of flow-through bore 23 were circular in shape. The contour of 23 has been altered from a circular shape to the shape illustrated in the drawings to improve performance in other respects.

The system also includes a drive means 37 for rotating the disc 3. The teeth on the drive means 37 engage with the teeth 39 on the outer periphery of the disc 3. The drive means 37 is rotated by means well known in the art and discussed in the above-mentioned references. It will of course be understood that different drive means than those shown in the drawings can be used. The drive means will rotate the disc 3 in the direction shown by arrow A in FIG. 1.

Flow-through bore 23 is contoured so that the bottom edge 43 of 23 corresponds with the shape of the back side of the leading edge 41 of each cavity. In addition, the right-hand edge 47 of flow-through bore 23 corresponds with the shape of the top edge 45 of each cavity, and the bottom edge 49 of each cavity corresponds with the left-hand edge 51 of the flow-through bore 19. Thus, a maximum portion of the screens in each cavity will be "active" when that cavity is in the flow-through channel. However, because of the correspondence in the shapes between the flow-through bores 19 (32 on 15R) and 23 and the cavities, each cavity may be smaller while supporting a larger active filter area.

It will of course be appreciated that each cavity comprises a space for a filter or screening stack on the side of the cavity closest to the plate 15, and that each cavity comprises a plurality of flow-through bores 10 (see FIG. 3). In fact, the cavities of the present application are similar to cavities as illustrated in the '502 U.S. patent and in the '343 A1 and '343 C2 German references above-mentioned.

The improvement to the filtration system which permits the evacuation of a cavity being flooded while that cavity is flooded is illustrated in FIG. 3 hereof. Referring to FIG. 3, plate 15 comprises a vacuum opening 53, which is connected to a vacuum pump. As can be seen in FIG. 3, the vacuum opening extends completely through the plate and is disposed adjacent to a cavity 11B which is entering the flow channel. A potential position for the vacuum opening is also illustrated in FIG. 1.

Disposed in the vacuum opening is a bleed valve 55. With the arrangement, the cavity being flooded will be evacuated at the same time that it is being flooded. When the cavity is flooded to the extent that plastic abuts the bleed valve, the bleed valve will close to terminate the vacuuming procedure. At the same time, it will ensure that plastic is not drawn up into the vacuum pump. Accordingly, the cavity being flooded will be evacuated while it is flooded and continues to be evacuated substantially until the entire cavity is flooded.

It can be seen that with the novel system the active filter area is increased while maintaining a very narrow flow from the source to maintain a high flow ratio. The flow-shape forming means 21 permits an increase in the active filter area without requiring an increase in the cross-sectional area of the molten plastic flow from the source.

The steadiness of the flow through the flow-through channel has been increased by increasing the number of cavities and making each of the cavity smaller. In addition, the performance of the filtration system is improved by evacuating means which evacuate the cavity being flooded while it is being flooded.

Although a particular embodiment has been described, this was for the purpose of illustrating, but not limiting, the invention. Various modifications, which will come readily to the mind of one skilled in the art, are within the scope of the invention as defined in the appended claims.

I claim:

1. A filtration system for filtering a molten plastic flow flowing from a source to a tool, comprising:
   a rotatable disc having an annularly arranged screening zone comprising a plurality of like cavities separated by spacing webs;
   a housing for said disc comprising a first plate having a front side and a rear side, and a second plate having a front side and a rear side, said disc being rotatably mounted between said rear side of said first plate and said front side of said second plate;
   a first flow-through bore in said first plate having a front side and a rear side, and a second, aligned, flow-through bore in said second plate having a front side and a rear side;
   said disc being mounted in said housing such that at least one of said cavities is in alignment with said first flow-through bore and said second flow-through bore, said first flow-through bore, said second flow-through bore and said at least one cavity forming a flow-through channel;
   said second flow-through bore having a preselected outer contour at the front side thereof;
   said first flow-through bore comprising flow-shape forming means for causing the contour of a cross-section of said molten flow at said rear side of said first flow-through bore to correspond with said preselected outer contour.

2. A system as defined in claim 1 wherein said flow-shape forming means comprises, on the front side of said first plate, a central circular core and a separated outer ring concentric with said central core;
   said central core being connected to said outer ring by a plurality of webs;
   the shape of said central core being transformed so that, at the rear side of the said first plate, it corresponds with said pre-selected outer contour.

3. A system as defined in claim 2 wherein the leading edge of each said cavity corresponds in shape with the bottom edge of said pre-selected contour;
   the top edge of each said cavity corresponds in shape with the right-hand edge of said pre-selected cavity; and
   the bottom edge of each said cavity corresponds in shape with the left-hand edge of said preselected contour.

4. A system as defined in claim 1 and including means for evacuating a cavity which has just entered said flow-through channel, said evacuating means comprising:
   an evacuating opening extending through said first plate into said cavity;
   bleed valve means disposed in said evacuating opening;
   whereby, when plastic being flooded into the cavity abuts said bleed valve, said evacuating opening is shut off.

* * * * *